US005295644A

United States Patent [19]
Ferguson, Jr.

[11] Patent Number: 5,295,644
[45] Date of Patent: Mar. 22, 1994

[54] BRACKET FOR MOUNTING AN ELECTRICAL OUTLET BOX

[76] Inventor: James A. Ferguson, Jr., 13802 N. 57th St., Scottsdale, Ariz. 85254

[21] Appl. No.: 862,297

[22] Filed: Apr. 2, 1992

[51] Int. Cl.$^5$ .............................................. G12B 9/00
[52] U.S. Cl. ..................................... 248/27.1; 220/3.9; 248/57
[58] Field of Search .............. 248/27.1, 906, 57, 300, 248/218.4; 220/3.9, 3.5

[56] References Cited

U.S. PATENT DOCUMENTS

| | | | |
|---|---|---|---|
| 1,056,759 | 3/1913 | Mallery | 248/906 X |
| 1,288,024 | 12/1918 | Kendig | 248/906 X |
| 1,515,216 | 11/1924 | Kissinger | 248/906 X |
| 1,756,361 | 4/1930 | Johnson | 248/906 X |
| 2,316,389 | 4/1943 | Atkinson | 248/906 X |
| 4,757,967 | 7/1988 | Delmore | 248/218.4 |
| 4,778,134 | 10/1988 | Struthers | 248/27.1 |
| 4,967,990 | 11/1990 | Rinder | 220/3.9 X |
| 5,114,105 | 5/1992 | Young | 248/27.1 |
| 5,209,444 | 5/1993 | Rinder | 248/205.1 |

Primary Examiner—J. Franklin Foss
Attorney, Agent, or Firm—Tod R. Nissle

[57] ABSTRACT

A support for positioning different sized electrical outlet boxes on a strut spanning the distance between a pair of adjacent studs in a wall. The strut includes panel-shaped fingers which can be bent to a position perpendicular to the strut to receive and support an electrical outlet box and to automatically align the face of the outlet box with the strut and plasterboard attached to the studs.

4 Claims, 2 Drawing Sheets

BRACKET FOR MOUNTING AN ELECTRICAL OUTLET BOX

This invention relates to a support for electrical outlet boxes and plaster rings.

More particularly, the invention relates to a support which readily positions different sized electrical outlet boxes on a strut intermediate the studs in a wall.

In a further respect, the invention relates to a support which readily positions plaster rings and electrical outlet boxes on a strut intermediate the studs in a wall such that the plaster rings and electrical boxes are automatically horizontally aligned when attached to the strut.

Strut support systems for electrical outlet boxes are well known in the art. See, for example, U.S. Pat. Nos. 4,757,967 to Delmore et al., 4,967,990 to Rinderer, 2,269,211 to Kuykendall, and 2,032,636 to Seckinger. Such prior art strut support systems utilize a horizontally oriented strut or elongate support member which is positioned between and connected to a spaced apart pair of studs in the wall of a home or other structure. These systems have limitations. First, the strut is normally positioned across and attached to the vertical back panel of the electrical outlet box. Since a primary purpose of the strut is to align the face of the outlet box with plasterboard which is attached to the studs, each strut is normally only readily utilized with an outlet box having a designated size or depth. If the depth of the outlet box being utilized is smaller or larger than the depth of the designated outlet box, then the strut must be bent or reshaped or simply cannot be utilized. Second, prior art struts are not intended to mount plaster rings alone or, more importantly, in conjunction with electrical boxes. This means that if a strut is utilized between a pair of studs to mount an electrical box, then a plaster ring ordinarily cannot also be mounted on the strut because the plaster ring will, even if it can be attached to the strut, be out of alignment with the electrical outlet box. Consequently, the plaster ring must be mounted between another pair of studs. This is a definite disadvantage because attempting to horizontally align the plaster ring with the electrical outlet box is awkward, time-consuming, and labor intensive, as is attempting to position the plaster ring at the same height from the floor as the outlet box.

Accordingly, it would be highly desirable to provide an improved strut system of the type described which would permit different sized electrical outlet boxes to be mounted on a common strut, would permit plaster rings and electrical outlet boxes to be mounted on a common strut, and would automatically vertically and horizontally align plaster rings and electrical outlet boxes mounted on a common strut.

Therefore, it is a principal object of the invention to provide an improved apparatus for mounting electrical outlet boxes and plaster rings between the studs of a wall.

A further object of the invention is to provide an improved strut which can be interposed between two adjacent studs in a wall such that electrical outlet boxes of differing size can be readily mounted on the strut and aligned with plasterboard attached to the studs.

Another object of the invention is to provide an improved strut of the type described which permits plaster rings and electrical outlet boxes to be simultaneously mounted on the strut such that the plaster rings are automatically aligned on the strut with electrical outlet boxes mounted on the strut.

Still a further object of the invention is to provide an improved strut of the type described which also functions as a measuring instrument for use in positioning similar struts a desired distance above the floor and between a pair of adjacent studs in a wall.

Yet another object of the invention is to provide an improved strut of the type described which includes fingers that are readily bent to a selected fixed orientation to facilitate the installation of electrical outlet boxes on the strut.

These and other, further and more specific objects and advantages of the invention will be apparent to those skilled in the art from the following detailed description thereof, taken in conjunction with the drawings, in which.

Figure 1:
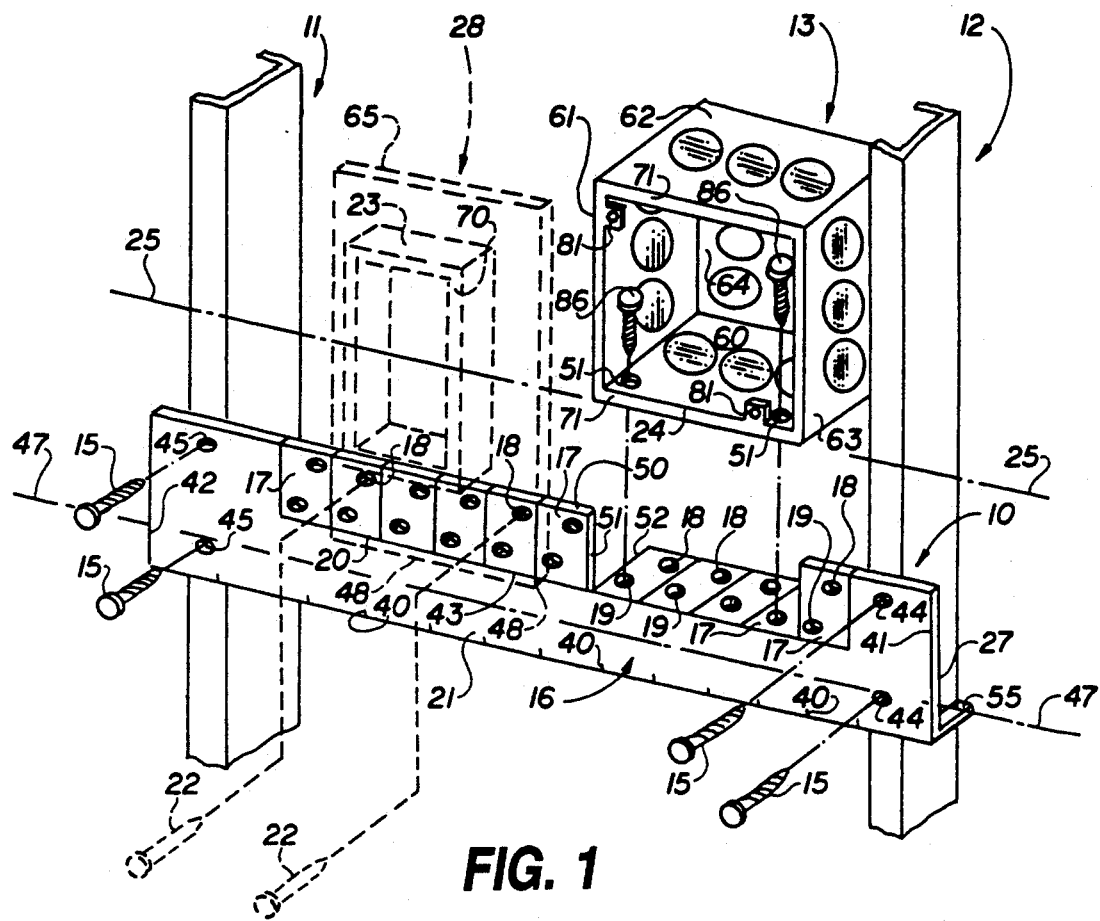
FIG. 1 is a perspective view illustrating an electrical box and plaster ring support strut constructed in accordance with the invention and connected to a pair of adjacent studs in a wall.

Briefly, in accordance with the invention, I provide an improved electrical box support for securing with fasteners an electrical box in position intermediate the studs in a wall. The electrical box includes a back; a plurality of sides attached to and outwardly extending from the back; and, at least first and second fastener receiving apertures formed through one of the sides. The electrical box support comprises a strut and means for securing the strut between adjacent studs. The strut includes an elongate generally planar panel member; a plurality of panel-shaped fingers connected to and generally perpendicular to the elongate planar member; and, at least one fastener receiving hole in each of the fingers. The fastener receiving holes in the fingers are positioned on the fingers such that when the electrical box is positioned on at least one of the fingers, one of the fasteners can be inserted through one of the fastener receiving apertures in the electrical box and the fastener receiving hole in the finger to secure the electrical box to the finger.

In another embodiment of my invention I provide an electrical box support for securing with fasteners an electrical box and a plaster ring in position intermediate the studs in a wall. The electrical box includes a back; a plurality of sides attached to and outwardly extending from the back; and, at least first and second fastener receiving apertures formed through one of the sides. The plaster ring includes a base; an aperture formed through the base; and, fastener receiving apertures formed through the base. The electrical box support comprises a strut and means for securing the strut between adjacent studs. The strut includes an elongate generally planar panel member having a longitudinal axis; at least one panel-shaped primary finger connected to and generally co-planar with the elongate planar member; at least one panel-shaped secondary finger attached to and generally perpendicular to the elongate planar member; and, at least a primary and a secondary fastener receiving hole formed through each of the fingers, the primary hole and the secondary hole being spaced apart. The primary fastener receiving hole in the secondary finger is positioned on the finger such that when the electrical box is positioned on the finger, one of the fasteners can be inserted through one of the fastener receiving apertures in the electrical box and the fastener receiving hole in the secondary finger to secure the electrical box to the finger. The secondary fastener receiving hole in the primary finger is positioned on the primary finger such that the plaster ring can be positioned against the primary finger and one of the fasteners can be inserted through one of the fastener receiving apertures in the plaster ring and the secondary fastener receiving hole in the primary finger to secure the plaster ring to the primary finger. The primary hole and the secondary hole can be spaced apart and formed in each of the fingers such that a selected portion of the plaster ring is aligned with the electrical box along a line parallel to the longitudinal axis of the elongate member when the plaster ring is attached to the primary finger on the strut; and, when the electrical box is attached to the secondary finger on the strut.

In still another embodiment of the invention, I provide apparatus for securing with fasteners an electrical box in position intermediate the studs in a wall. The electrical box includes a back; a plurality of sides attached to and outwardly extending from the back; and, at least first and second fastener receiving apertures formed through one of the sides of the box. The apparatus of the invention includes an electrical box support and a tool used in conjunction with the support. The electrical box support comprises a strut and means for securing the strut between adjacent studs.

The strut includes an elongate generally planar panel member; a plurality of panel-shaped fingers connected to and generally co-planar with the elongate planar member; and, at least one fastener receiving hole in each of the fingers. The fingers are each bendable to a horizontally oriented position generally perpendicular to the panel member to receive and support the one of the sides of the electrical box. The fastener receiving holes in the fingers are positioned on the fingers such that when the electrical box is positioned on at least one of the fingers when the fingers is bent to a position perpendicular to the panel member, one of the fasteners can be inserted through one of the fastener receiving apertures in the electrical box and the fastener receiving hole in the finger to secure the electrical box to the finger. The tool bends the fingers from a position co-planar with the elongate member to a position perpendicular to the elongate member. The tool includes a head; and, a handle attached to the head. The head includes a slot for slidably receiving at least one of the fingers and for bending the finger when the head is pivoted in a selected direction about an axis parallel to the longitudinal axis of the elongate member; and, a face for contacting the elongate member and preventing continued movement of the head in the selected direction after the finger is bent to a position perpendicular to the elongate member.

Turning now to the drawings, which depict the presently preferred embodiments of the invention for the purpose of illustrating the practice thereof and not by way of limitation of the scope of the invention and in which like reference characters represent corresponding elements throughout the several views, FIG. 1 illustrates a bracket or strut 10 horizontally disposed between a pair of studs 11, 12. Studs 11, 12 can be comprised of wood, metal, or any other desired material. One end of strut 10 includes apertures 44. Nails, screws or other fasteners 15 are inserted through apertures 44 and into stud 12 to secure strut 10 to stud 12. The other end of strut 10 includes apertures 45. Fasteners 15 are inserted through aperture 45 and into stud 11 to secure strut 10 to stud 11. Strut 10 includes elongate panel member 16 having a longitudinal axis 47, a front planar surface 21, and a rear planar surface 27. Panel-shaped fingers 17 are attached to and outwardly depend from panel member 16. As shown by the left-most six fingers 17 in FIG. 1, fingers 17 normally lie in the plane which passes through member 16 and is parallel to surfaces 21, 27. As indicated, however, by the four fingers 17 in FIG. 1 which are perpendicular to planar surfaces 21, 27, fingers 17 can each be bent from a position co-planar with surface 21 to a position perpendicular to surface 21.

Each rectangular finger 17 is not connected to an adjacent finger 17 and can, without bending any of the other fingers 17, be bent from a position co-planar with surface 21 to a position perpendicular to surface 21. While the bottom portion or "edge" of each finger 17 is connected to member 16 along score line 20, the other three sides or rectangular edges 50, 51, 52 of each finger 17 are free and are not connected to member 16 or an adjacent finger 17. The distal edges or outer most tips 50 of fingers 17 help define the linear upper edge of strut 10 in FIG. 1.

In FIG. 1, each finger 17 is, for sake of illustration, of equal size and dimension. As would be appreciated by those of skill in the art, each finger 17 need not be of equal size, but making each finger 17 of equal size often facilitates use of the strut of the invention. Also, in FIG. 1 spaced apart apertures 18 and 19 are formed through and at identical locations on each finger 17. Apertures 19 are positioned on fingers 17 such that when an electrical outlet box 13 is placed on fingers 17 which are perpendicular to member 16 and fasteners 16 are inserted through apertures 51 in box 13 and through apertures 19 to secure box 13 to fingers 17, the front edge 24 of box 13 is generally aligned and flush with face 21.

In FIG. 1, the distance between the two apertures 19 which are formed through the outermost or bounding two of the four fingers 17 which are normal to member 16 is equal to the distance between the two apertures 51 formed through the side 60 of box 13. This permits each aperture 51 to align with an aperture 19 on a finger 17. The two outermost fingers 17 bound the other two of said four normal finger 17 in FIG. 1. Sides 60, 61, 62, and 63 are attached to and outwardly depend from the back 64 of box 13.

Apertures 18 are positioned on fingers 17 such that when a plaster ring 28 is positioned adjacent fingers 17 which are co-planar with member 16 and fasteners 22 are inserted through apertures (not shown) formed in ring 28 and through apertures 18 to secure ring 28 to fingers 17, the lower edge 48 of ring 28 is generally aligned with the edge 24 of box 13.

In FIG. 1, the distance between the two apertures 18 which receive fasteners 22 is equal to the distance between the two apertures (not shown in FIG. 1) which are formed through the rectangular base 65 of ring 28 and receive fasteners 22. This permits each aperture in base 65 to align with an aperture 18 on a finger 17.

If desired, apertures 18 and 19 can be positioned on fingers 17 and/or fingers 17 shaped and dimensioned such that when ring 28 and box 13 are secured to strut 10 in the manner illustrated in FIG. 1, edge 48 of ring 28 aligns with some portion of box 13 other than edge 24, or, apertures 18 and 19 can be positioned on fingers 17 such that when ring 28 and box 13 are secured to strut 10 in the manner illustrated in FIG. 1 some portion of ring 28 other than edge 48 aligns with a selected portion of box 13. In general, it is desired than when ring 28 and box 13 are mounted on strut 10 the plaster ring 28 and box 13 are each centered on a selected horizontal axis (like axis 25) which is parallel to the longitudinal axis 47.

After an outlet box 13 is mounted on member 16 in the manner illustrated in FIG. 1, a plaster ring 28 is normally attached to an outlet box 13 using fasteners which pass through the plaster ring 28 and through internally threaded apertures 81 formed on tabs in box 13. Apertures 18 and 19 can be positioned on fingers 17 such that when a first plaster ring 28 is secured to vertical fingers 17 by fasteners 22 in the manner illustrated in FIG. 1, and when a second plaster ring is attached to the front of box 13 by using fasteners extending through the plaster ring and apertures 81 of box 13, then the first and second plaster rings are aligned with each other along a common horizontal axis, are each in a common upright orientation, and are each centered on a selected horizontal axis. In FIG. 1, ring 28 is centered on axis 25. When a plaster ring 28 is secured to the front of box 13, the lower edge 48 of the ring 28 is, due the shape and dimension of commonly used rings 28 and boxes 13, presently positioned about one-sixteenth to one-eighth of an inch below edge 24 of box 13.

Strut 10 is scored with line 20 to facilitate the bending of fingers 17 from a position co-planar with surface 21 to a position perpendicular to elongate member 16.

Ordinarily, two fasteners are utilized to secure a box 13 or ring 28 to fingers 17. Once, however, box 13 or ring 28 are appropriately positioned against fingers 17, a single fastener through an aligned aperture pair 19-51 or through an aperture in ring 28 aligned with an aperture 18 can be snugly tightened to maintain the box 13 or ring 28, respectively, in position against fingers 17.

Short lines or scribe marks 40 are formed along an edge of strut 10 and are spaced apart an inch or some other selected distance such that one end of strut 10 can be placed on the floor and the strut 10 vertically oriented to measure the distance of a selected point above the floor. Marking each strut 10 for use as a ruler enables one strut 10 to be utilized to insure that each end of another strut 10 being attached to studs 11, 12 is equidistant above the floor.

Feet 55 can be attached to or depend from the lower edge of member 16 to provide increased structural strength for strut 10. In FIG. 1, although not visible, feet 55 outwardly depend from the lower edge of member 16 between studs 11 and 12, are normal to member 16, and extend the distance between studs 11 and 12. Feet 55 can be seen in FIG. 4.

Figure 2:
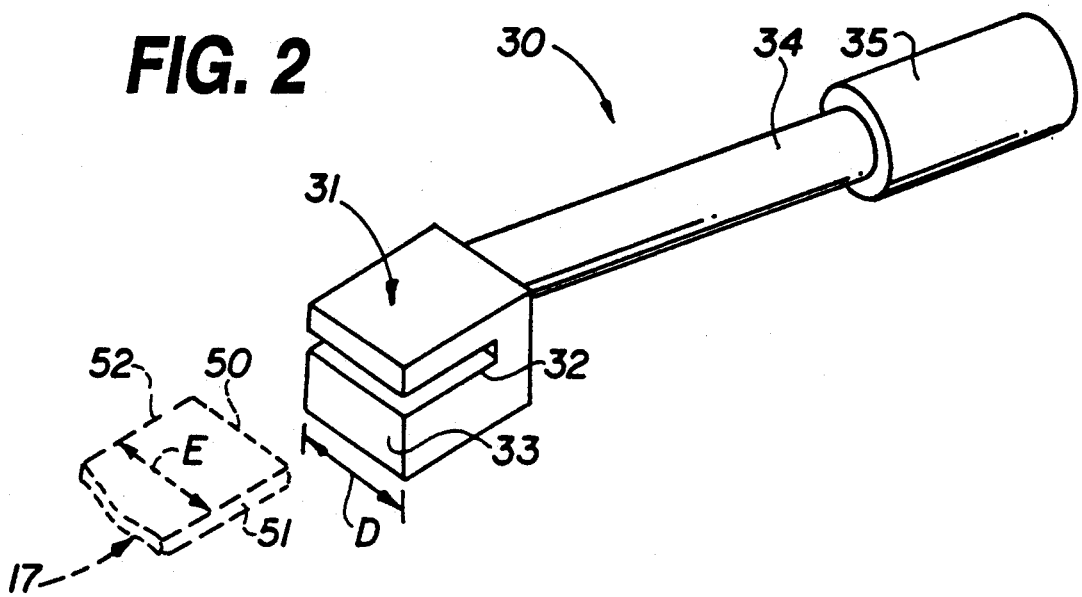
FIG. 2 is a perspective view illustrating a tool utilized to bend finger panel members on the strut of FIG. 2.
Figure 3:
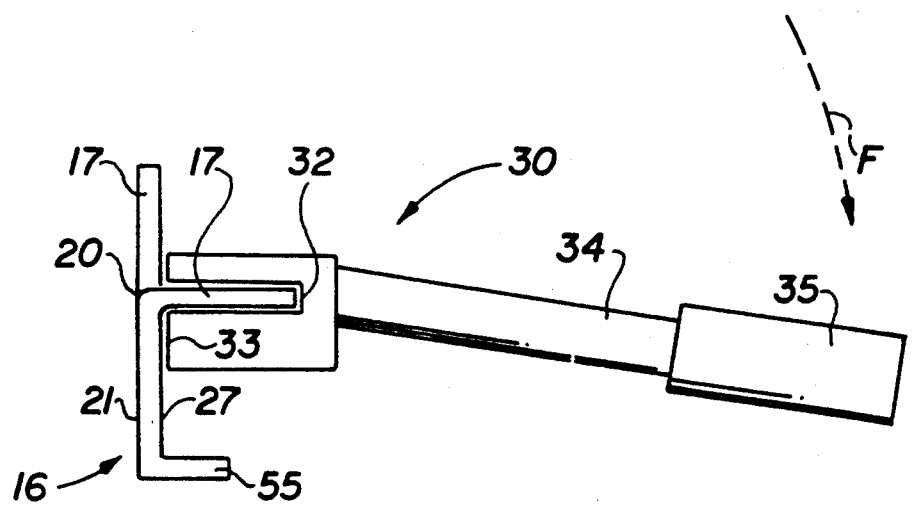
FIG. 3 is a side view of the tool of FIG. 2 illustrating the mode of operation thereof; and, FIG. 4 is a top view illustrating an alternate embodiment of the invention.

FIG. 2 illustrates a tool 30 utilized to slidably engage and bend a finger 17. Tool 30 includes head 31 and a handle including neck 34 and end 35. Slot 32 is formed in head 31. Head 31 and slot 32 have a width, indicated by arrows D, equal to or less than the width, indicated by arrows E, of a finger 17. Slot 32 is shaped and dimensioned to slidably receive a finger 17 such that the finger can, when the handle of tool 30 is pulled in a direction of travel circumscribing and generally perpendicular to scribe line 20, bend finger 17 from a position co-planar to surface 21 (as illustrated in FIG. 1) to a position perpendicular to surface 21 (as also illustrated in FIG. 1). FIG. 3 illustrates slot 32 engaging a finger 17 after tool 30 has been pivoted about score line 20 in the direction of arrow F until the finger slidably engaged by slot 32 is perpendicular to surface 21. In FIG. 3, planar face 33 of head 31 has contacted back surface 27 of elongate member 16 to halt the movement of the handle of tool 30 in the direction of arrow F. Since face 33 is perpendicular to slot 32, when face 33 contacts member 16 and halts the movement of tool 30 in the direction of arrow F, the finger 17 engaged by slot 32 is normal to surfaces 21, 27. If desired, tool 30 can, in contrast to the "fixed" jaws of tool 30 illustrated in FIGS. 2 and 3, include pivotally attached jaws which, like the jaws of a pliers, clamp down on and engage at least one finger 17. One of the pivoting jaws can include a surface similar to face 33 which, after the tool has been pivoted a selected amount in the direction of arrow F, contacts member 16 to halt the pivoting of the tool once finger 17 is perpendicular to (or at some other selected angle) with respect to member 15. Or, in another embodiment of the tool 30, the jaws can be slidably interconnected.

The various apertures 18, 19, 44, 45 formed in the strut of the invention can be pre-drilled or pre-formed or can be drilled on site.

If the distance between a pair of adjacent studs 11, 12 is sufficient, two or more rings 28 and/or two or more boxes 13 can be mounted on the strut 10 spanning the distance between studs 11, 12.

After rings 28 and outlet boxes 13 are attached to strut 10, plasterboard or wallboard is affixed to studs 11 and 12 in a manner well known in the art. Typically, before the plasterboard is fastened to studs 11 and 12, openings for each ring 28 and box 13 are cut through the plasterboard.

Figure 4:
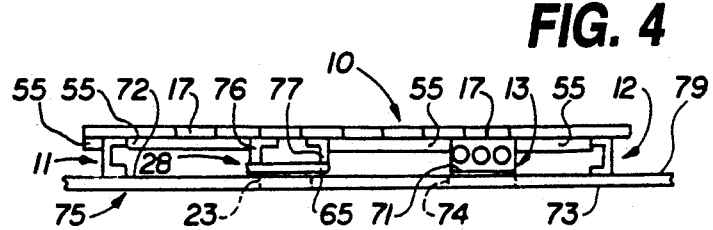

In the embodiment of the invention illustrated in FIG. 1, strut 10 is attached to the front sides of studs 11, 12. In the embodiment of the invention shown in FIG. 4, strut 10 is attached to the opposite, or back sides of studs 11, 12 and none of the fingers 17 are perpendicular to member 16. Instead, each finger 17 is parallel to and coplanar with member 16. A sheet of plasterboard is attached to the front sides of studs 11, 12 in FIG. 4. Further, in FIG. 4 the base plate 65 of plaster ring 28 is also parallel to fingers 17 and member 16 of strut 10. Plaster ring 28 is connected to and spaced away from strut 10 by L-shaped brackets 76 and 77. Fasteners (not visible) extend through brackets 76 and 77 and into apertures 18 or 19 in fingers 17. Fasteners (not visible) also secure ring 28 to brackets 76 and 77. The back 64 (not visible in FIG. 1) of box 13 is parallel to, contacts, and is fastened to selected ones of fingers 17 by fasteners (not visible) which extend through back 64 and into apertures 18 or 19 in fingers 17. L-shaped brackets 76, 77 function to space ring 28 away from strut 10 such that outwardly extending collar 23 extends through an opening cut through plasterboard 75 and the rectangular front edge 70 of ring 28 is generally co-planar with the planar front surface 73 of plasterboard 75. The opening cut through plasterboard 75 for collar 23 is normally slightly larger than collar 23. The square front edge 71 of box 13 is generally adjacent and co-planar with the rear planar surface 79 of plasterboard 75 and is adjacent, circumscribes, and is about the same size as a square aperture 74 cut through plasterboard 75. Any prior art apparatus or structural member(s) other than L-shaped brackets 76, 77 can be used to space ring 28 away from strut 10 and to attached ring 28 to strut 10. Similarly, any prior art apparatus or structural members can be used to connect box 13 to strut 10 and to if necessary, space box 13 away from strut 10. In the embodiment of the invention shown in FIG. 4, struts can be used which have a shape and dimension different than strut 10. The strut used can be attached to studs 11 and 12 at any desired location. The purpose of the embodiment of the invention illustrated in FIG. 4 is to attach ring 28 and box 13 to a common strut spanning studs 11 and 12 so that the edges 70 and 71 are in a desired position adjacent or flush with one of the planar front 73 and back 79 surfaces of plasterboard 75. It is not believed that prior art support systems have permitted a plaster ring 28 and electrical outlet box 13 to be attached to a common strut spanning the space between a pair of adjacent studs 11, 12.

Having described my invention in such terms as to enable those skilled in the art to understand and practice it, and having identified the presently preferred embodiments thereof, I claim:

1. An electrical box support for securing with fasteners an electrical box in position intermediate the studs in a wall, said electrical box including
    a back,
    a plurality of sides attached to and outwardly extending from said back, and at least first and second fastener receiving apertures formed through one of said sides,
said electrical box support comprising
    (a) a strut including
        (i) an elongate generally planar panel member;
        (ii) a plurality of panel-shaped fingers connected to and generally perpendicular to said elongate planar member; and,
        (iii) at least one fastener receiving hole in each of said fingers; and,
    (b) means for securing said strut between adjacent studs;
said fastener receiving holes in said fingers being positioned on said fingers such that when said electrical box is positioned on at least one of said fingers, one of said fasteners can be inserted through one of said fastener receiving apertures in said electrical box and said fastener receiving hole in said one of said fingers to secure said electrical box to said one of said fingers.

2. An electrical box support for securing with fasteners an electrical box and a plaster ring in position intermediate the studs in a wall, said electrical box including
    a back,
    a plurality of sides attached to and outwardly extending from said back, and
    at least first and second fastener receiving apertures formed through one of said sides,
said plaster ring including
    a base,
    an aperture formed through said base, and fastener receiving apertures formed through said base, said electrical box support comprising
    (a) a strut including
        (i) an elongate generally planar panel member having a longitudinal axis,
        (ii) at least one panel-shaped primary finger connected to and generally co-planar with said elongate planar member,
        (iii) at least one panel-shaped secondary finger connect to and generally perpendicular to said elongate planar member, and,
        (iv) at least a primary and a secondary fastener receiving hole formed through each of said fingers, said primary hole and said secondary hole being spaced apart; and,
    (b) means for securing said strut between adjacent studs;
said primary fastener receiving hole in said secondary finger being positioned on said fingers such that when said electrical box is positioned on said secondary finger, one of said fasteners can be inserted through one of said fastener receiving apertures in said electrical box and said fastener receiving hole in said one of said fingers to secure said electrical box to said secondary finger; said secondary fastener receiving hole in said primary finger being positioned on said finger such that said plaster ring can be positioned against said primary finger and one of said fasteners can be inserted through one of said fastener receiving apertures in said plaster ring and said secondary fastener receiving hole in said primary finger to secure said plaster ring to said primary finger.

3. The support of claim 2 wherein said primary hole and said secondary hole are spaced apart and formed in each of said fingers such that said plaster ring is aligned with said electrical box along a line parallel to said longitudinal axis of said elongate member when
    (a) said plaster ring is attached to said primary finger; and,
    (b) said electrical box is attached to said secondary finger.

4. Apparatus for securing with fasteners an electrical box in position intermediate the studs in a wall, said electrical box including
    a back,
    a plurality of sides attached to and outwardly extending from said back, and
    at least first and second fastener receiving apertures formed through one of said sides,
said apparatus including
    (a) an electrical box support comprising
        (i) a strut including an elongate generally planar panel member having a longitudinal axis; a plurality of panel-shaped fingers connected to and generally co-planar with said elongate planar member; and, at least one fastener receiving hole in each of said fingers; and,
        (ii) means for securing said strut between adjacent studs;
        said fingers each being bendable to a position generally perpendicular to said panel member to receive and support said one of said sides of said electrical box;
        said fastener receiving holes in said fingers being positioned on said fingers such that when said electrical box is positioned on at least one of said fingers when one of said fingers is bent to a position perpendicular to said panel member, one of said fasteners can be inserted through one of said fastener receiving apertures in said electrical box and said fastener receiving hole in said one of said fingers to secure said electrical box to said one of said fingers; and,
    (b) tool for bending said fingers from a position coplanar with said elongate member to a position perpendicular to said elongate member, said tool including
        (i) a head including a slot for slidably receiving at least one of said fingers and for bending said finger when said head is pivoted in a selected direction about an axis parallel to said longitudinal axis of said elongate member, and a face for contacting said elongate member and preventing continued movement of said head in said selected direction after said finger is bent to a position perpendicular to said elongate member; and,
        (ii) a handle connected to said head.

* * * * *